FIG. 1
FIG. 2
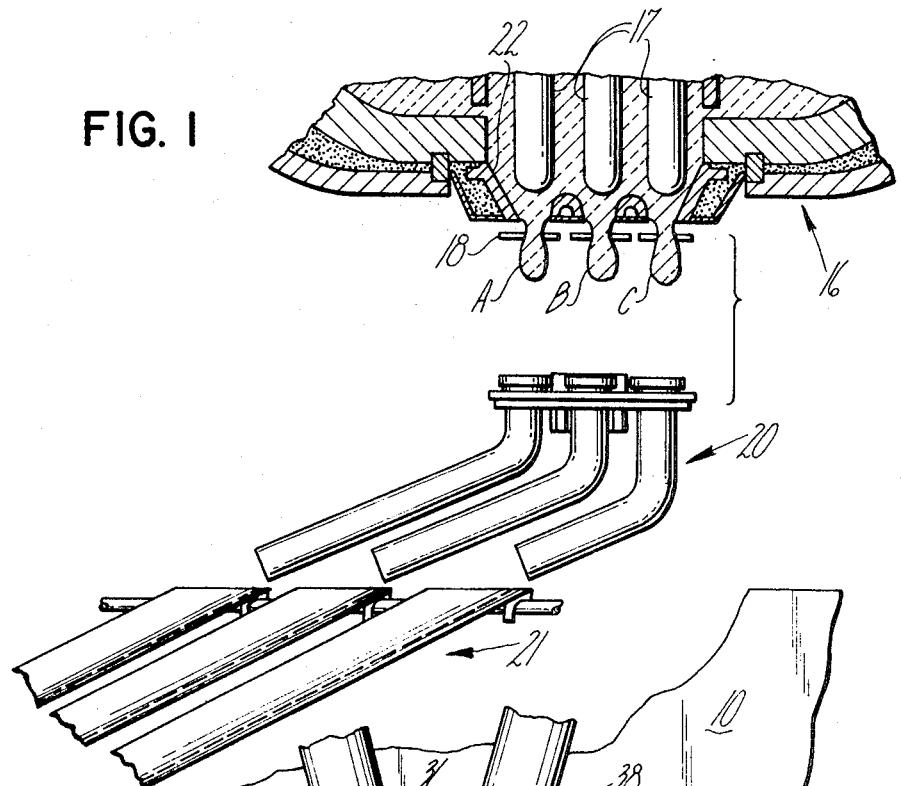
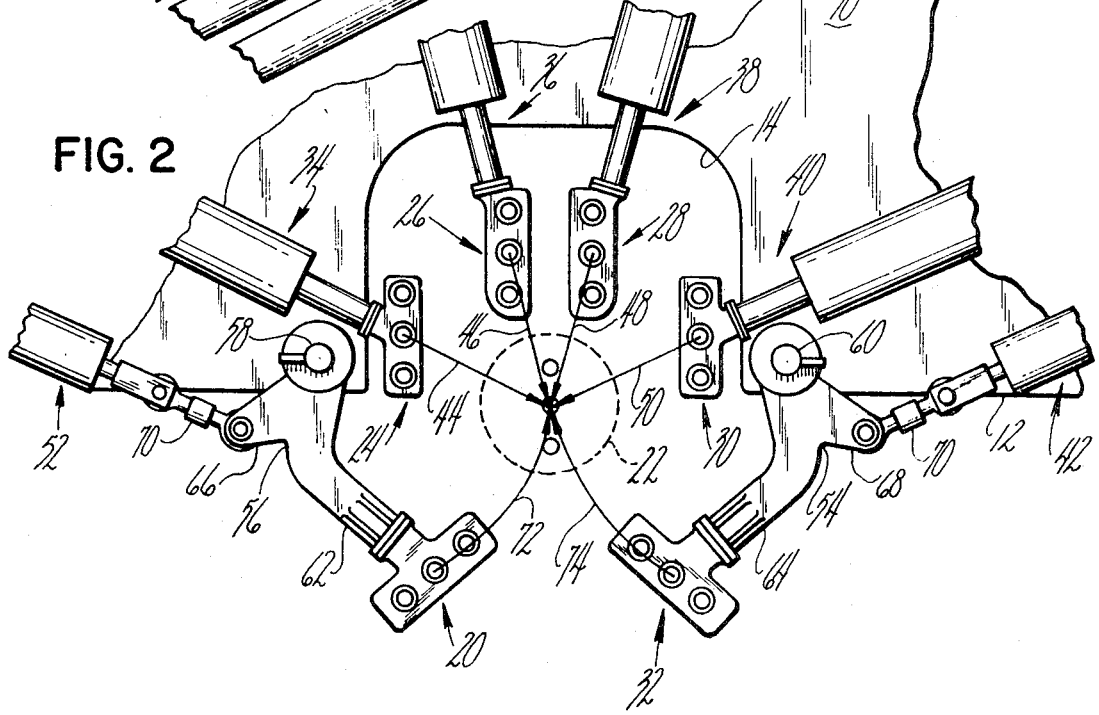
INVENTOR.
FRANCIS A. DAHMS

United States Patent Office 3,592,624
Patented July 13, 1971

3,592,624
SCOOP OPERATING MECHANISM FOR A MOLTEN GLASS DELIVERY SYSTEM
Francis A. Dahms, Tariffville, Conn., assignor to Emhart Corporation, Bloomfield, Conn.
Filed Sept. 20, 1968, Ser. No. 761,258
Int. Cl. C03b 7/00
U.S. Cl. 65—304      4 Claims

ABSTRACT OF THE DISCLOSURE

A plurality of scoop operating fluid motors are mounted in a semi-circular pattern atop a triple gob glassware forming machine for successively moving a plurality of scoops from and to active positions beneath a triple gob feeder bowl. The machine is a six section Hartford I. S. machine, and has triple gob scoops associated with each section. Four of the six scoops are connected directly to the reciprocating parts of four of the fluid motors, and the two end scoops are connected to one arm of a horizontally pivotable bellcrank mounted to the machine frame, the bellcrank having a second arm which is driven by one of the two endmost fluid motors through a short intermediate link, to move its associated scoop arcuately in a horizontal plane.

SUMMARY OF INVENTION

This invention relates to scoop operating mechanisms for a glassware forming machine of the Hartford I. S. type, and deals more particularly with a novel mechanism for moving at least one of several scoops from and to an active position beneath a feeder bowl located adjacent the machine frame.

In a conventional plural section Hartford I. S. machine, the fluid motors for operating the scoops associated with these sections are conveniently mounted atop the machine frame in closely spaced radial relationship as best shown in FIG. 2 of Pat. No. 1,911,119, issued to Ingle in 1933. However, where the number of sections has exceeded the four shown in this patent, and where the sections have been adapted from the so-called single gob to double, or triple gob capability, the radial spacing between the adjacent scoop mechanisms has necessarily increased from that shown in the above patent in order that the scoops do not interfere with one another in their motion from and to the feeder bowl outlet.

The general object of the present invention is to provide a scoop operating mechanism for a plural section machine of the foregoing character wherein a plurality of triple gob scoops can be moved successively to and from active positions beneath a feeder bowl by a plurality of fluid motors all of which are mounted on one side of the feeder bowl, and hence can be conveniently mounted on the machine frame as required by the basic geometry of a Hartford I. S. type plural section glassware forming machine.

BRIEF DESCRIPTION OF THE DRAWINGS

FIG. 1 is a schematic side elevational view of one of several scoop operating mechanisms mounted in accordance with the present invention atop a glassware forming machine of the type adapted to receive successively formed gob groupings from a feeder bowl provided adjacent the machine frame.

FIG. 2 is a plan view of the glassware forming machine frame, showing six radially arranged scoops and associated operating mechanisms, each of which is adapted to be moved in the direction of the arrow indicated to an active position beneath the feeder bowl (not shown).

DETAILED DESCRIPTION

Figure 3:
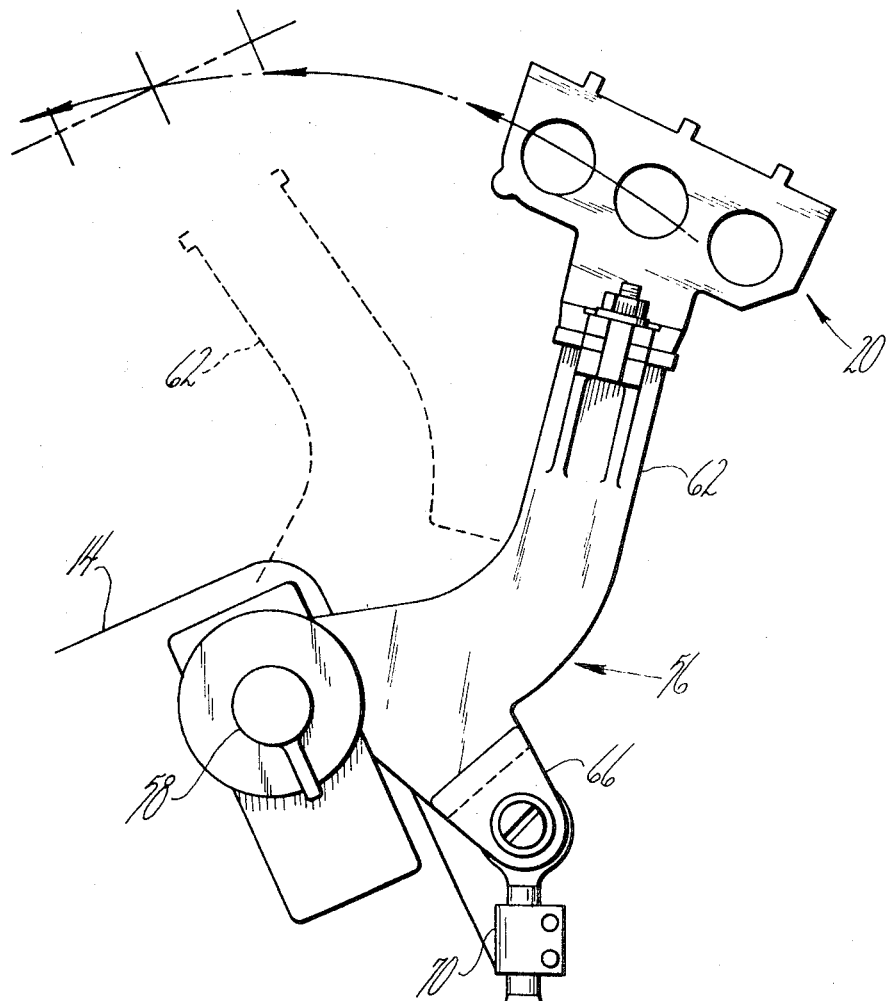
FIG. 3 is a detailed plan view of one of the endmost scoop operating mechanisms shown in FIG. 2, the inactive position being shown in full lines and the active position being shown schematically in broken lines in that view.

Turning now to the drawings in greater detail, FIGS. 1 and 2 show a glassware forming machine frame 10, and more particularly the upper portion thereof, to which a plurality of scoop operating mechanisms of the present invention are adapted to be mounted. A feeder bowl 16 is provided slightly above and to one side of the machine frame 10 at the downstream end of a forehearth (not shown) and a plurality of vertically reciprocable plungers 17, 17 are provided in the feeder bowl for successively forming gobs A, B, and C of glass which are adapted to be severed by reciprocable shears, indicated generally at 18, so as to drop downwardly into one of several movable scoop means as indicated at 20 into a like number of fixed chute means, as indicated at 21, for delivery to one of several machine sections for subsequent forming into glassware articles. The feeder bowl 16 is of conventional construction and need not be described in detail herein, having an orifice plate 22 provided in the outlet spout thereof in the manner shown. The orientation of this orifice plate 22 with respect to the machine frame 10 is indicated by the broken line circle in FIG. 2.

The machine frame 10 includes a longitudinally extending edge 12 best shown in FIG. 2 which defines an inwardly extending generally semi-circular opening 14 and the three orifices in the plate 22 are oriented in line with one another at right angles to the longitudinal edge 12 of the machine frame. The array or cluster of scoops and their associated operating mechanisms are oriented symmetrically with respect to this line and the scoop 32 can be seen to be right hand version of the left hand scoop 20.

Still with reference to FIG. 2, four of the six scoops, namely 24, 26, 28, and 30, are directly connected to the reciprocable portion of their associated fluid motors 34, 36, 38 and 40 respectively for motion in a straight line from and to active positions beneath the outlet spout of the feeder bowl, as indicated by the arrows 44, 46, 48 and 50, respectively. These fluid motors 34, 36, 38 and 40 are radially arranged with respect to the center of the outlet spout, and more particularly with the angular spacing therebetween dictated principally by the clearance requirement of the adjacent portions of the respective scoops 24, 26, 28 and 30. More particularly, the centermost fluid motors 36 and 38 associated with the scoops 26 and 28 are arranged in close proximity to one another since these particular triple gob scoops have their gob openings oriented nearly in line with the direction of the arrows 46 and 48. The fluid motors 34 and 40 associated with the scoops 24 and 30, on the other hand, are angularly spaced from one another to provide clearance for these particular scoops. It will be apparent to those skilled in the art that these four scoop operating mechanisms associated with the four center scoops 24, 26, 28 and 30, occupy approximately 150° of the approximately 180° available at the top of the machine frame 10 for mounting of the six scoop operating mechanisms shown. In the case of a double gob machine (not shown) six of these mechanisms might be spread out through approximately 180° radially with the feeder bowl outlet located in the manner shown in FIG. 2 with sufficient clearance for the movable scoops. However, with the triple gob scoops required in a triple gob glassware forming machine, the angular spacing between adjacent mechanisms would require some 240° if all the scoop operating mechanisms were mounted in a conventional manner, that, is in the manner shown for the four center scoops 24, 26, 28 and 30.

In accordance with the present invention, the endmost scoops 20 and 32 are not directly connected to their associated fluid motors 52 and 42 respectively, but instead are mounted at a slightly greater radial distance from the center of the orifice plate 22, adjacent the longitudinal edge 12 of the machine frame 10, and at substantially the same angle as that provided for the fluid motors 34 and 40. A pair of bell cranks 54 and 56 are pivotally mounted on the machine frame as shown at 58 and 60 with one arm of each of these bellcranks 62 and 64 being connected to its associated scoop, 20 and 32, respectively. A pair of shorter arms, 66 and 68, are each connected through an intermediate link 70 to the movable portion of the fluid motors 52 and 42 so that the endmost scoops, 20 and 32, follow an arcuate path from and to active positions beneath the feeder bowl, as indicated by the curved arrows 72 and 74 in FIG. 2.

FIG. 3 illustrates the detailed construction of the bellcrank 56, and its associated pivot post 58. The arm 62 is shown in two positions, an active position in broken lines and an inactive position in full lines. The fluid motor 52 comprises a conventional air operated actuator with a fixed part mounted to the machine frame 10 adjacent the edge 12, and a movable or reciprocable part which is pivotally connected to the arm 66 of the bellcrank 56 through an intermediate link 70.

I claim:

1. A molten glass delivery system for conveying successively formed glass gob groupings from a molten glass feeder bowl to the various sections of a multi-gob glassware forming machine having a frame which defines a generally semi-circular side opening, comprising scoop means associated with each machine section for guiding the glass gob groupings as they drop downwardly from the feeder bowl, fixed chute means for guiding these gob groupings to their associated machine sections, means for sequentially moving each scoop means from and to active positions beneath the feeder bowl to sequentially deliver successive gob groupings to said chute means, said means for so moving said scoop means including a reciprocatory fluid motor associated with each machine section and operable in timed relationship therewith, at least some of said fluid motors being arranged radially in a cluster below the feeder bowl to move their associated scoop means radially from and to said active positions, and at least one bellcrank, one end of which bellcrank being connected to one of said scoop means and the other end being drivingly connected to one of said fluid motors, said bellcrank being pivotally supported on said machine frame to move its associated scoop means arcuately in a horizontal plane.

2. The combination defined in claim 1 wherein two bellcranks are provided one on either side of the cluster of radially arranged fluid motors, said fluid motors associated with said two bellcranks being disposed diametrically opposite one another and being radially spaced from the feeder bowl by a distance greater than the radial displacement of said non-bellcrank associated fluid motors.

3. The combination defined in claim 2 wherein all of said fluid motors which are connected directly to their associated scoop means are arranged in a semi-circular pattern between said diametrically opposed bellcrank associated fluid motors, and all of said fluid motors being mounted on the machine frame and oriented generally radially with respect to said frame side opening.

4. The combination defined in claim 3 wherein both said bellcrank associated fluid motors each have a connecting link between their respective movable parts and said bellcranks, all of said fluid motors having fixed parts mounted to said machine as aforesaid.

References Cited

UNITED STATES PATENTS

| | | | |
|---|---|---|---|
| 1,766,979 | 6/1930 | Canfield | 65—225X |
| 1,911,119 | 5/1933 | Ingle | 65—225X |
| 2,598,955 | 6/1952 | Winder | 65—304X |

S. LEON BASHORE, Primary Examiner

S. R. FRIEDMAN, Assistant Examiner

U.S. Cl. X.R.

65—225

PO-1050
(5/69)

UNITED STATES PATENT OFFICE
CERTIFICATE OF CORRECTION

Patent No. 3,592,624      Dated July 13, 1971

Inventor(s) Francis A. Dahms

It is certified that error appears in the above-identified patent and that said Letters Patent are hereby corrected as shown below:

Col. 2, line 46, following "particularly" insert --with respect to the center orifice in the orifice plate 22--.

Col. 2, line 71, after "that" delete comma.

Col. 3, line 7, "bell cranks" should be one word.

Signed and sealed this 25th day of January 1972.

(SEAL)
Attest:

EDWARD M. FLETCHER, JR.
Attesting Officer

ROBERT GOTTSCHALK
Commissioner of Patents